United States Patent
Hur et al.

(10) Patent No.: US 10,005,028 B2
(45) Date of Patent: Jun. 26, 2018

(54) CAPTURING METHOD OF CARBON DIOXIDE USING HYDRAZINE DERIVATIVE

(71) Applicant: Sogang University Research Foundation, Seoul (KR)

(72) Inventors: Nam Hwi Hur, Seoul (KR); Byeongno Lee, Gyeonggi-do (KR)

(73) Assignee: Sogang University Research Foundation, Seoul (KR)

( * ) Notice: Subject to any disclaimer, the term of this patent is extended or adjusted under 35 U.S.C. 154(b) by 248 days.

(21) Appl. No.: 15/045,390

(22) Filed: Feb. 17, 2016

(65) Prior Publication Data
US 2016/0243499 A1 Aug. 25, 2016

(30) Foreign Application Priority Data
Feb. 17, 2015 (KR) .......................... 10-2015-0024204

(51) Int. Cl.
  *B01D 53/14* (2006.01)
  *B01D 53/62* (2006.01)
  *B01D 53/78* (2006.01)

(52) U.S. Cl.
  CPC ............. *B01D 53/62* (2013.01); *B01D 53/78* (2013.01); *B01D 2252/10* (2013.01); *B01D 2257/504* (2013.01); *Y02C 10/04* (2013.01); *Y02C 10/06* (2013.01)

(58) Field of Classification Search
None
See application file for complete search history.

(56) References Cited

FOREIGN PATENT DOCUMENTS

KR     20130106680 A  *  9/2013
KR  1020130103979 A     9/2013

OTHER PUBLICATIONS

KR-20130106680-A English Translation (Year: 2013).*
Jamal, Aqil, "Absorption and Desorption of CO2 and CO in Alkanolamine Systems," Doctoral Thesis, The University of British Columbia (Jul. 2002): pp. 1-380.
Davis et al., "Thermal Degradation of monoethanolamine at stripper conditions," Energy Procedia 1 (2009):327-333.
Chi et al., "Oxidative Degradation of Monoethanolamine," Ind. Eng. Chem. Res. (2002); 41(17):4178-4186.
Hur et al., "Reaction Mechanism of CO2 with Hydrazine in Aqueous Solutions," The 5th Korea CCS International Conference (Sep. 2, 2015-Nov. 2, 2015):1-4.

* cited by examiner

*Primary Examiner* — Anita Nassiri Motlagh
(74) *Attorney, Agent, or Firm* — Fox Rothschild LLP

(57) ABSTRACT

Disclosed is a method of capturing carbon dioxide using a hydrazine derivative.

11 Claims, 1 Drawing Sheet

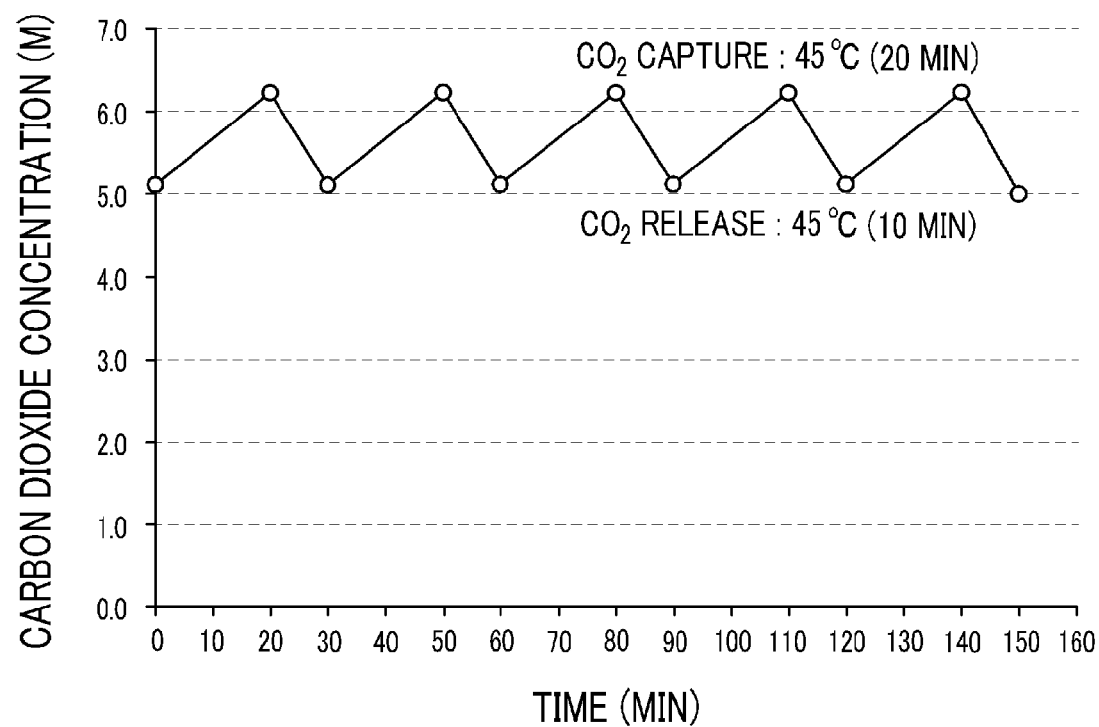

CAPTURING METHOD OF CARBON DIOXIDE USING HYDRAZINE DERIVATIVE

CROSS-REFERENCE TO RELATED APPLICATION

This application claims the benefit under 35 USC 119(a) of Korean Patent Application No. 10-2015-0024204 filed on Feb. 17, 2015, in the Korean Intellectual Property Office, the entire disclosure of which is incorporated herein by reference for all purposes.

TECHNICAL FIELD

The present disclosure relates to a method of capturing carbon dioxide using a hydrazine derivative.

BACKGROUND

Since $CO_2$ was mainly blamed for global warming, there have been attempts to minimize $CO_2$ emission through an international convention or the like. Along with such an international movement, research and development on fuel which can emit less $CO_2$ with higher efficiency using the same fossil fuel has been conducted. Also, research and development on a method of efficiently capturing $CO_2$ generated from factories or power plants using fossil fuels and separately storing or reusing carbon dioxide has been continuously conducted.

The methods of capturing carbon dioxide can be roughly classified into three methods: a chemical absorption method using a liquid desiccant; a physical adsorption method using a solid material; and a separation method using a film. The chemical absorption method using a liquid desiccant such as alkanol amine has been regarded as a very excellent capturing method in terms of economic feasibility or application of a process. However, the biggest problem of the conventional process using alkanol amine as a desiccant is that although it is easy to capture alkanol amine since it can be chemically strongly bonded to $CO_2$, a recovering process for separating these two substances after capturing requires a high temperature, i.e. high energy, and alkanol amine is decomposed during the high-temperature recovering process, resulting in sharp deterioration in performance of the desiccant. Therefore, in order to uniformly maintain the amount of the desiccant during the whole process, it is necessary to continuously supply the desiccant in an amount as much as the amount of the decomposed and consumed desiccant.

By way of example, as for mono-ethanol-amine (MEA) having high industrial applicability, an amine functional group of MEA is chemically strongly bonded to $CO_2$, and, thus, a high temperature of 100° C. or more is needed to separate these two substances after capturing and MEA needs to be continuously supplied in an amount as much as the amount of MEA decomposed and consumed during the capturing process [J. Davis and G. T. Rochelle, Energy Procedia, 1, 327 (2009)]. Further, MEA is highly reactive, and, thus, MEA primarily erodes a container surface and iron ions or radicals generated on the container surface cause decomposition of the desiccant. Then, decomposition products generated at the beginning cause additional reactions with oxygen, so that various kinds of organic oxides may be formed and the decomposition of MEA may be accelerated [S. Chi and G. T. Rochelle, Ind. Eng. Chem. Res., 41, 4178 (2002)].

Therefore, in order to efficiently capture and recover carbon dioxide included in an exhaust gas using the chemical absorption method, it is necessary to develop a novel desiccant having the following characteristics: 1) being not easily oxidized in the air; 2) being able to easily adsorb $CO_2$ even at a low temperature; 3) being able to easily desorb $CO_2$ from a compound capturing $CO_2$ at a relatively low temperature of 100° C. or less; 4) having a very low steam pressure; and 5) being not decomposed at a recovering temperature for desorption.

SUMMARY

In view of the foregoing, the present disclosure provides a method of capturing carbon dioxide, including adsorbing carbon dioxide with a hydrazine derivative.

However, problems to be solved by the present disclosure are not limited to the above-described problem. Although not described herein, other problems to be solved by the present disclosure can be clearly understood by those skilled in the art from the following descriptions.

In accordance with an aspect of the present disclosure, there is provided a method of capturing carbon dioxide, including: adsorbing carbon dioxide with a hydrazine derivative represented by the following Chemical Formula 1 or 2:

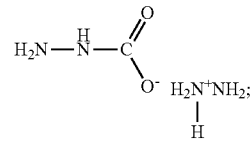

[Chemical Formula 1]

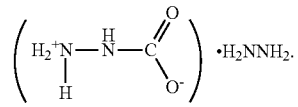

[Chemical Formula 2]

In accordance with another aspect of the present disclosure, there is provided a composition for capturing carbon dioxide, including: a hydrazine derivative represented by the above Chemical Formula 1 or 2.

A method of capturing carbon dioxide according to an embodiment of the present disclosure can efficiently capture and recover carbon dioxide with lower energy using a hydrazine derivative, and, thus, can be applied to various fields for storing and utilizing carbon dioxide.

A composition for capturing carbon dioxide according to an embodiment of the present disclosure includes a hydrazine derivative which is excellent in thermal stability and absorption of carbon dioxide at atmospheric pressure and capable of being recovered with lower energy, and thus, can be used as a carbon dioxide absorbent and can also be substituted for conventional alkanol amine-based absorbents, e.g., MEA.

Particularly, the hydrazine derivate used in the method of capturing carbon dioxide and the composition for capturing carbon dioxide in accordance with an embodiment of the present disclosure has the following advantages: 1) being able to rapidly adsorb $CO_2$ around a pressure from an exhaust gas at a low temperature (e.g., room temperature) even with lower alkalinity than alkanol amine such as MEA; 2) being able to easily desorb carbon dioxide from a compound capturing $CO_2$ even at a relatively low temperature (e.g., 100° C. or less); 3) being able to desorb $CO_2$ at a relatively low temperature with almost no occurrence of decomposition of absorbent; 4) being not easily oxidized in the air; and 5) being very stable since it has a much higher boiling point than hydrazine or MEA, resulting in almost no occurrence of evaporation which may occur during adsorption and desorption of $CO_2$.

BRIEF DESCRIPTION OF THE DRAWINGS

FIG. 1 is a carbon dioxide adsorption/desorption graph in accordance with an example of the present disclosure.

DETAILED DESCRIPTION

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments of the present disclosure will be described in detail. However, the present disclosure may not be limited to the following embodiments.

In accordance with an aspect of the present disclosure, there is provided a method of capturing carbon dioxide, including: adsorbing carbon dioxide with a hydrazine derivative represented by the following Chemical Formula 1 or 2:

[Chemical Formula 1]
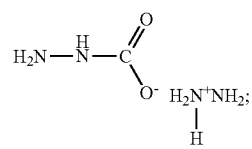

[Chemical Formula 2]
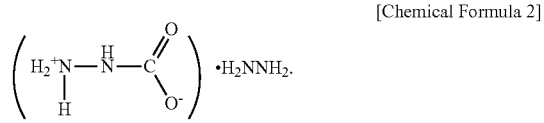

In an embodiment of the present disclosure, the method of capturing carbon dioxide may use hydrazine derivatives represented by the above Chemical Formula 1 and/or 2, but may not be limited thereto. If a mixture including hydrazine derivatives represented by the above Chemical Formulas 1 and 2 is used in the method of capturing carbon dioxide, a hydrazine derivative represented by the above Chemical Formula 1 may be contained in an amount of from about 20 wt. % to about 95 wt. %, for example, from about 30 wt. % to about 95 wt. %, from about 40 wt. % to about 95 wt. %, from about 50 wt. % to about 95 wt. %, from about 60 wt. % to about 95 wt. %, from about 70 wt. % to about 95 wt. %, from about 20 wt. % to about 90 wt. %, from about 20 wt. % to about 80 wt. %, from about 20 wt. % to about 70 wt. %, from about 20 wt. % to about 60 wt. %, from about 20 wt. % to about 50 wt. %, from about 20 wt. % to about 40 wt. %, or from about 20 wt. % to about 30 wt. % with respect to the total weight of all the hydrazine derivatives, but may not be limited thereto.

In an embodiment of the present disclosure, the carbon dioxide may include $CO_2$ in a gaseous state, $CO_2$ in a solid state, $CO_2$ in a liquid state, or supercritical carbon dioxide, or may be a carbon dioxide-containing mixed gas such as an exhaust gas or air, but may not be limited thereto. When carbon dioxide is captured from the carbon dioxide-containing mixed gas, the hydrazine derivative may be directly applied to an exhaust gas from factories or cars including a small amount of carbon dioxide, or may be applied to the exhaust gas after the exhaust gas is compressed under high pressure.

In an embodiment of the present disclosure, the mixed gas may contain $CO_2$ in an amount of from about 1 vol. % to about 99 vol. %, or from about 5 vol. % to about 50 vol. %, but may not be limited thereto.

In an embodiment of the present disclosure, the aspect of the present disclosure may further include: desorbing the adsorbed carbon dioxide, but may not be limited thereto.

In an embodiment of the present disclosure, the adsorbing of carbon dioxide may be performed in a solventless state, but may not be limited thereto.

In an embodiment of the present disclosure, the adsorbing of carbon dioxide may be performed in water or in a mixed solvent including water and an organic solvent, but may not be limited thereto.

In an embodiment of the present disclosure, the adsorbing of carbon dioxide may be performed in an aqueous solution, but may not be limited thereto.

In an embodiment of the present disclosure, the aqueous solution may further include an organic solvent, but may not be limited thereto.

In an embodiment of the present disclosure, the organic solvent may include alcohol, ether, aliphatic hydrocarbon, aromatic hydrocarbon, or combinations thereof, but may not be limited thereto.

In an embodiment of the present disclosure, the alcohol may include one selected from the group consisting of methanol, ethanol, propanol, isopropanol, n-butanol, isobutanol, sec-butanol, tert-butanol, n-pentanol, isopentanol, sec-pentanol, tert-pentanol, hexanol, heptanol, octanol, nonanol, decanol, undecanol, dodecanol, pentadecanol, ethylene glycol, glycerol, erythritol, xylitol, and mannitol, but may not be limited thereto.

In an embodiment of the present disclosure, the ether may include one selected from the group consisting of ether having 2 to 20 carbon atoms, for example, dimethyl ether, diethyl ether, tetrahydrofuran, and dioxine, but may not be limited thereto.

In an embodiment of the present disclosure, if the adsorbing of carbon dioxide is performed in an aqueous solution or a mixed solvent, an amount of the solvent may be from about 1 wt. % to about 99 wt. % with respect to the total weight, but may not be limited thereto. The amount of the solvent may be, for example, from about 1 wt. % to about 99 wt. %, from about 10 wt. % to about 90 wt. %, or from about 20 wt. % to about 85 wt. % with respect to the total weight, but may not be limited thereto.

In an embodiment of the present disclosure, the adsorbing of carbon dioxide may be performed under a pressure of from about 1 psi to about 3000 psi, but may not be limited thereto. The pressure may be, for example, from about 1 psi to about 3000 psi, from about 1 psi to about 2500 psi, from about 1 psi to about 2000 psi, from about 1 psi to about 1500 psi, from about 1 psi to about 1000 psi, from about 1 psi to about 750 psi, from about 1 psi to about 500 psi, from about 1 psi to about 250 psi, from about 1 psi to about 200 psi, from about 1 psi to about 100 psi, from about 1 psi to about 50 psi, from about 1 psi to about 25 psi, from about 1 psi to about 10 psi, from about 1 psi to about 3 psi, from about 3 psi to about 3000 psi, from about 10 psi to about 3000 psi, from about 25 psi to about 3000 psi, from about 50 psi to about 3000 psi, from about 100 psi to about 3000 psi, from about 200 psi to about 3000 psi, from about 250 psi to about 3000 psi, from about 500 psi to about 3000 psi, from about 750 psi to about 3000 psi, from about 1000 psi to about 3000 psi, from about 1500 psi to about 3000 psi, from about 2000 psi to about 3000 psi, from about 2500 psi to about 3000 psi, or from about 3 psi to about 100 psi, but may not be limited thereto.

In an embodiment of the present disclosure, the adsorbing of carbon dioxide may be performed at a temperature of from about −20° C. to about 60° C., but may not be limited thereto. The temperature during the adsorption may be, for example, from about −20° C. to about 100° C., from about −20° C. to about 80° C., from about −20° C. to about 60° C., from about −20° C. to about 50° C., from about −20° C. to about 40° C., from about 0° C. to about 100° C., from about 0° C. to about 80° C., from about 0° C. to about 60° C., from about 0° C. to about 40° C., from about 20° C. to about 40° C., from about 40° C. to about 100° C., or from about 60° C. to about 100° C., but may not be limited thereto.

In an embodiment of the present disclosure, the desorbing of the adsorbed carbon dioxide may be performed at a temperature of from about 70° C. to about 100° C., but may not be limited thereto. The temperature during the desorption may be, for example, from about 70° C. to about 100° C., from about 70° C. to about 90° C., from about 70° C. to about 80° C., from about 80° C. to about 100° C., or from about 90° C. to about 100° C., but may not be limited thereto. —claim 10

In an embodiment of the present disclosure, the capturing method may include: producing a compound represented by the following Chemical Formula 3 by adsorbing $CO_2$ to the hydrazine derivative represented by the above Chemical Formula 1 or 2, but may not be limited thereto:

$$(H_2NNH_2)_2 \cdot H_2CO_3.$$ [Chemical Formula 3]

In an embodiment of the present disclosure, the compound represented by the above Chemical Formula 3 may be produced by adsorbing $CO_2$ to the hydrazine derivative represented by the above Chemical Formula 1 or 2 in the presence of water ($H_2O$), but may not be limited thereto.

In accordance with another aspect of the present disclosure, there is provided a composition for capturing carbon dioxide, including: a hydrazine derivative represented by the following Chemical Formula 1 or 2:

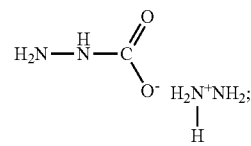

[Chemical Formula 1]

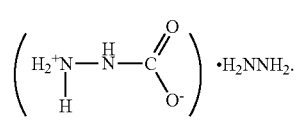

[Chemical Formula 2]

In an embodiment of the present disclosure, the composition for capturing carbon dioxide may include hydrazine derivatives represented by the above Chemical Formula 1 and/or 2, but may not be limited thereto. If the composition for capturing carbon dioxide includes a mixture including hydrazine derivatives represented by the above Chemical Formulas 1 and 2, the mixture may include a hydrazine derivative represented by the above Chemical Formula 1 in an amount of from about 20 wt. % to about 95 wt. %, for example, from about 30 wt. % to about 95 wt. %, from about 40 wt. % to about 95 wt. %, from about 50 wt. % to about 95 wt. %, from about 60 wt. % to about 95 wt. %, from about 70 wt. % to about 95 wt. %, from about 20 wt. % to about 90 wt. %, from about 20 wt. % to about 80 wt. %, from about 20 wt. % to about 70 wt. %, from about 20 wt. % to about 60 wt. %, from about 20 wt. % to about 50 wt. %, from about 20 wt. % to about 40 wt. %, or from about 20 wt. % to about 30 wt. % with respect to the total weight of all the hydrazine derivatives, but may not be limited thereto.

In an embodiment of the present disclosure, the composition for capturing carbon dioxide may further include water or a mixed solvent including water and an organic solvent, but may not be limited thereto.

In an embodiment of the present disclosure, the organic solvent may include alcohol, ether, aliphatic hydrocarbon, aromatic hydrocarbon, or combinations thereof, but may not be limited thereto.

In an embodiment of the present disclosure, the alcohol may include one selected from the group consisting of methanol, ethanol, propanol, isopropanol, n-butanol, isobutanol, sec-butanol, tert-butanol, n-pentanol, isopentanol, sec-pentanol, tert-pentanol, hexanol, heptanol, octanol, nonanol, decanol, undecanol, dodecanol, pentadecanol, ethylene glycol, glycerol, erythritol, xylitol, and mannitol, but may not be limited thereto.

In an embodiment of the present disclosure, the ether may include one selected from the group consisting of ether having 2 to 20 carbon atoms, for example, dimethyl ether, diethyl ether, tetrahydrofuran, and dioxine, but may not be limited thereto.

In an embodiment of the present disclosure, if the composition for capturing carbon dioxide includes a solvent such as water or a mixed solvent, an amount of the solvent may be from about 1 wt. % to about 99 wt. % with respect to the total weight of the composition for capturing carbon dioxide, but may not be limited thereto. The amount of the solvent may be, for example, from about 1 wt. % to about 99 wt. %, from about 10 wt. % to about 90 wt. %, or from about 20 wt. % to about 85 wt. % with respect to the total weight of the composition for capturing carbon dioxide, but may not be limited thereto.

In an embodiment of the present disclosure, the composition for capturing carbon dioxide can adsorb carbon dioxide included in an exhaust gas from factories and cars or air and thus can be used as a carbon dioxide absorbent for suppressing global warming. Further, the composition for capturing carbon dioxide can desorb the captured carbon dioxide and thus can be used for keeping and storing carbon dioxide. Further, the hydrazine derivative according to an embodiment of the present disclosure is stable without being decomposed after adsorption and/or desorption of carbon dioxide and thus can be reused and has the advantage of being able to repeat adsorption/desorption of carbon dioxide.

The hydrazine derivative included in the composition for capturing carbon dioxide according to an embodiment of the present disclosure has a very high boiling point and thus has a very low steam pressure. Therefore, the hydrazine derivative is scarcely evaporated during a process of capturing $CO_2$ through a reaction with carbon dioxide and recovering $CO_2$. Further, since the bonding force between the hydrazine derivative and carbon dioxide is relatively smaller than the bonding force between amine and carbon dioxide, the hydrazine derivative can adsorb and desorb carbon dioxide with remarkably lower energy than alkanol amine-based compounds such as MEA.

Hereinafter, the present disclosure will be explained in more detail with reference to Examples. However, the following Examples are illustrative only for understanding of the present disclosure, but the present disclosure may not be limited thereto.

EXAMPLE

Example 1

7.6 g hydrazine carboxylate (HC; $H_3N^+NHCOO^-$) in which hydrazine and carbon dioxide were bonded at a ratio of 1:1 was put into a reactor and heated at 200° C. for 1 hour to obtain 5.4 g gel-state product. An analysis of the obtained product revealed that the acquired product was a mixture of $H_2NNHCOO^-H_3N^+NH_2$ (HHC-A) and $(H_3N^+NHCOO^-)$ $H_2NNH_2$ (HHC-B) including hydrazine and carbon dioxide bonded at a ratio of 2:1.

Example 2

The conditions were the same as in Example 1 except heating at 250° C. for 30 minutes. 5.4 g product was a mixture of $H_2NNHCOO^-H_3N^+NH_2$ (HHC-A) and $(H_3N^+NHCOO^-)H_2NNH_2$ (HHC-B) including hydrazine and carbon dioxide bonded at a ratio of 2:1.

Example 3

The conditions were the same as in Example 1 except heating at 150° C. for 5 hours. 5.4 g product was a mixture of $H_2NNHCOO^-H_3N^+NH_2$ (HHC-A) and $(H_3N^+NHCOO^-)$ $H_2NNH_2$ (HHC-B) including hydrazine and carbon dioxide bonded at a ratio of 2:1.

Example 4

The conditions were the same as in Example 1 except heating at 80° C. for 250 hours. 5.4 g product was a mixture of $H_2NNHCOO^-H_3N^+NH_2$ (HHC-A) and $(H_3N^+NHCOO^-)$ $H_2NNH_2$ (HHC-B) including hydrazine and carbon dioxide bonded at a ratio of 2:1.

Example 5

The conditions were the same as in Example 1 except heating at 300° C. for 10 minutes. 5.1 g product was a mixture of $H_2NNHCOO^-H_3N^+NH_2$ (HHC-A) and $(H_3N^+NHCOO^-)H_2NNH_2$ (HHC-B) including hydrazine and carbon dioxide bonded at a ratio of 2:1.

Example 6

The conditions were the same as in Example 1 except heating at 400° C. for 5 minutes. 4.7 g product was a mixture of $H_2NNHCOO^-H_3N^+NH_2$ (HHC-A) and $(H_3N^+NHCOO^-)$ $H_2NNH_2$ (HHC-B) including hydrazine and carbon dioxide bonded at a ratio of 2:1.

Example 7

5 g hydrazine monohydrate (hydrazine of 64 wt. %) was put into a 50 mL-reactor with addition of carbon dioxide gas while uniformly maintaining a gas pressure of 5 psi at room temperature and then reacted with each other for 50 minutes, so that 7.2 g gel-state product was obtained. An analysis of the obtained product revealed that the obtained product was a mixture of $H_2NNHCOO^-H_3N^+NH_2$ (HHC-A) and $(H_3N^+NHCOO^-)H_2NNH_2$ (HHC-B) including hydrazine and carbon dioxide bonded at a ratio of 2:1.

Example 8

The conditions were the same as in Example 7 except a temperature maintained at 15° C. The result of analysis of 7.2 g product was the same as in Example 7.

Example 9

The conditions were the same as in Example 7 except that a temperature was maintained at 0° C. and a reaction time was changed to 40 minutes. The result was the same as in Example 7.

Example 10

The conditions were the same as in Example 7 except that a temperature was maintained at −20° C. and a reaction time was changed to 30 minutes. The result was the same as in Example 7.

Example 11

The conditions were the same as in Example 7 except that a temperature was maintained at 45° C. and a reaction time was changed to 60 minutes. The result was the same as in Example 7.

Example 12

The conditions were the same as in Example 7 except that a temperature was maintained at 60° C. and a reaction time was changed to 60 minutes. The result was the same as in Example 7.

Example 13

The conditions were the same as in Example 7 except that 10 g hydrazine hydrate (hydrazine of 32 wt. %) was used and a reaction time was changed to 40 minutes. 12.2 g of a solution was obtained, and the result of analysis was the same as in Example 7.

Example 14

The conditions were the same as in Example 7 except that 10 g hydrazine hydrate (hydrazine of 20 wt. %) was used and a reaction time was changed to 40 minutes. 11.38 g of a solution was obtained, and the result of analysis was the same as in Example 7.

Example 15

The conditions were the same as in Example 7 except that 10 g hydrazine hydrate (hydrazine of 10 wt. %) was used and a reaction time was 40 minutes. 10.69 g of a solution was obtained, and the result of analysis was the same as in Example 7.

Example 16

The conditions were the same as in Example 7 except that 10 g hydrazine hydrate (hydrazine of 5 wt. %) was used. 10.34 g of a solution was obtained, and the result of analysis was the same as in Example 7.

Example 17

68 g water was added to the 54 g product obtained in Example 1 with stirring for 5 minutes at room temperature. Carbon dioxide was added to the aqueous solution while uniformly maintaining a gas pressure of 5 psi at 45° C. and then reacted with each other for 20 minutes. After the reaction, the mass of a product was measured and it was observed that the mass of the aqueous solution (after adsorption of carbon dioxide) was increased by 4.8 g. The supply of carbon dioxide was stopped and a −20° C.-cooling condenser was installed at a temperature of 80° C., and then, heating was performed for 10 minutes. Then, the mass of the aqueous solution (after desorption of carbon dioxide) was measured and it was observed that the mass was decreased by as much as the increased mass of 4.8 g.

Comparative Example 1

14.2 g water was added to 6.1 g mono-ethanol-amine (MEA) to prepare an aqueous solution of about 30 wt. %. A carbon dioxide gas was added in the same conditions as in Example 17 and reacted with the aqueous solution for 240 minutes. After the reaction, it was observed that about 2.2 g carbon dioxide was adsorbed to MEA. A −20° C.-cooling condenser was installed, and then, heating was performed at 80° C. for 480 minutes. Then, the mass of a product was measured again. As a result, the mass was decreased by 1.9 g due to desorption of carbon dioxide. From the above result, it was confirmed that in the case of desorbing carbon dioxide from conventional MEA after adsorption of carbon dioxide, carbon dioxide was not completely desorbed.

Example 18

The conditions were the same as in Example 17 except that adsorption of carbon dioxide was performed at 25° C. The amount and the result of the obtained product were the same as in Example 17.

Example 19

The conditions were the same as in Example 17 except that adsorption of carbon dioxide was performed at 0° C. The amount and the result of the obtained product were the same as in Example 17.

Example 20

The conditions were the same as in Example 17 except that desorption of carbon dioxide was performed at 90° C. The amount and the result of the obtained product were the same as in Example 17.

Example 21

The conditions were the same as in Example 17 except that a mixed solution including 32 g water and 32 g ethanol was used instead of water (64 g). The amount and the result of the obtained product were the same as in Example 17.

Example 22

The conditions were the same as in Example 17 except that a mixed solution including 32 g water and 32 g ethylene glycol was used instead of water (64 g). The amount and the result of the obtained product were the same as in Example 17.

Example 23

The conditions were the same as in Example 17 except that a mixed solution including 32 g water, 16 g ethylene glycol, and 16 g dibutyl ether was used instead of water (64 g). The amount and the result of the obtained product were the same as in Example 17

Example 24

The same process as in Example 17 was repeated 5 times. The result thereof was as shown in FIG. 1. The amount of a hydrazine derivative (the product obtained in Example 1) was 44.3 wt. % and the concentration thereof was 5 M.

FIG. 1 is a carbon dioxide adsorption/desorption graph when adsorption (20 minutes) and desorption (10 minutes) of carbon dioxide was repeatedly performed according to the present Example. As shown in FIG. 1, it could be seen that a composition for capturing carbon dioxide including the hydrazine derivative according to the present Example could

We claim:

1. A method of capturing carbon dioxide, comprising:
   adsorbing carbon dioxide with a hydrazine derivative represented by the following Chemical Formula 1 or 2:

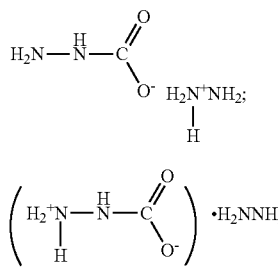

[Chemical Formula 1]

[Chemical Formula 2]

2. The method of capturing carbon dioxide of claim 1, further comprising:
   desorbing the adsorbed carbon dioxide.

3. The method of capturing carbon dioxide of claim 1, wherein the adsorbing of carbon dioxide is performed in an aqueous solution.

4. The method of capturing carbon dioxide of claim 3, wherein the aqueous solution further includes an organic solvent.

5. The method of capturing carbon dioxide of claim 4, wherein the organic solvent includes alcohol, ether, aliphatic hydrocarbon, aromatic hydrocarbon, or combinations thereof.

6. The method of capturing carbon dioxide of claim 5, wherein the alcohol includes one selected from the group consisting of methanol, ethanol, propanol, isopropanol, n-butanol, isobutanol, sec-butanol, tert-butanol, n-pentanol, isopentanol, sec-pentanol, tert-pentanol, hexanol, heptanol, octanol, nonanol, decanol, undecanol, dodecanol, pentadecanol, ethylene glycol, glycerol, erythritol, xylitol, and mannitol.

7. The method of capturing carbon dioxide of claim 5, wherein the ether includes one selected from the group consisting of dimethyl ether, diethyl ether, tetrahydrofuran, and dioxine.

8. The method of capturing carbon dioxide of claim 1, wherein the adsorbing of carbon dioxide is performed under a pressure of from 1 psi to 3000 psi.

9. The method of capturing carbon dioxide of claim 1, wherein the adsorbing of carbon dioxide is performed at a temperature of from −20° C. to 60° C.

10. The method of capturing carbon dioxide of claim 2, wherein the desorbing of the adsorbed carbon dioxide is performed at a temperature of from 70° C. to 100° C.

11. The method of capturing carbon dioxide of claim 1, further comprising:
    producing a compound represented by the following Chemical Formula 3 by adsorbing $CO_2$ to the hydrazine derivative represented by the above Chemical Formula 1 or 2:

$(H_2NNH_2)_2 \cdot H_2CO_3$. [Chemical Formula 3]

* * * * *